J. F. LAMB.

VACUUM BOTTLE CASING.

APPLICATION FILED OCT. 9, 1915.

Reissued Dec. 28, 1915.

14,038.

WITNESSES:

Louis Lucca

Ann E. O'Brien

INVENTOR.

Joseph F. Lamb:

BY Stullart.

ATTORNEY.

UNITED STATES PATENT OFFICE.

JOSEPH F. LAMB, OF NEW BRITAIN, CONNECTICUT, ASSIGNOR TO LANDERS, FRARY & CLARK, OF NEW BRITAIN, CONNECTICUT, A CORPORATION OF CONNECTICUT.

VACUUM-BOTTLE CASING.

Specification of Reissued Letters Patent. Reissued Dec. 28, 1915.

14,038.

Original No. 1,147,632, dated July 20, 1915, Serial No. 826,902. Application for reissue filed October 9, 1915. Serial No. 55,105.

*To all whom it may concern:*

Be it known that I, JOSEPH F. LAMB, a citizen of the United States, and a resident of New Britain, in the county of Hartford, State of Connecticut, have invented certain new and useful Improvements in Vacuum-Bottle Casings, of which the following is a specification.

The object of this invention is to produce a casing for vacuum bottles and the like, having features of novelty and advantage.

Figure 1:
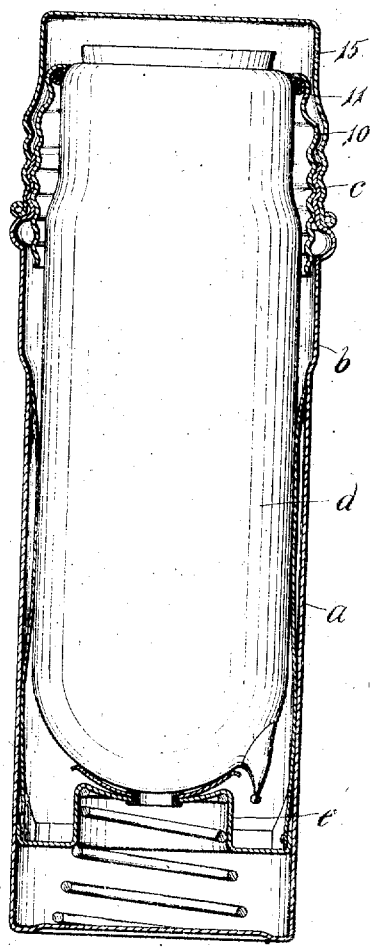
Figure 2:
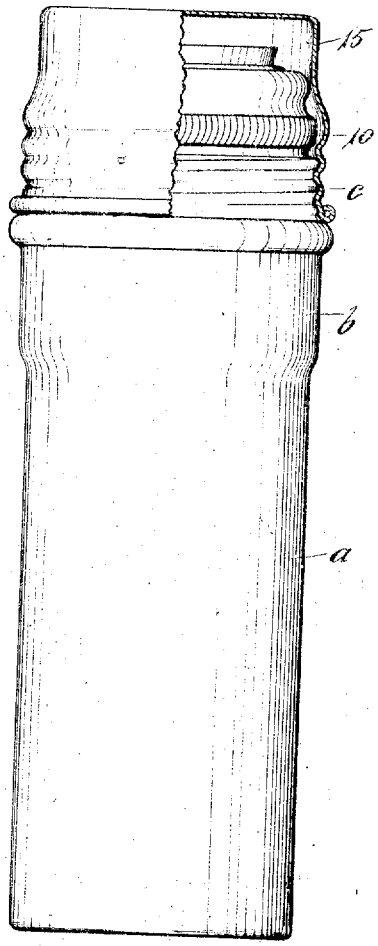

In the drawings—Figure 1 is a central vertical section of a casing embodying my invention. Fig. 2 is a side elevation thereof, with the cap broken away.

Referring to the drawings, *a* denotes the main body of the casing having a slight enlargement *b* at its upper end, the upper edge of the casing being exteriorly and interiorly threaded as indicated at *c*. These casings are made of sheet metal and the thread can be conveniently formed by rolling. The vacuum bottle *d* fits within the casing and is preferably yieldingly supported as for instance by the structure indicated generally by *e*, comprising a coiled spring to take end thrust, and elastic upstanding arms contacting with the bottle and the casing to take side thrust. The neck of the bottle is engaged by the inwardly curved end of the sleeve 10, between which and the bottle there is positioned a yielding gasket 11, and the lower end of this sleeve is threaded and fitted to the inner threads at the top of the casing. These threads on the casing and on this sleeve are of substantial length in order that the variations in the length of the bottles can be accommodated, and the bottle properly seated in the yielding support within the casing to avoid breakage. A cap 15 which may be used as a cup is threaded and fitted to the exterior threads at the upper end of the casing, forming a complete closure for the upper end of the casing and a protector for the cork or other stopper which is fitted into the mouth of the vacuum bottle.

By the hereinabove described arrangement of the parts there is provided a very secure means for holding the bottle in the casing, a means which is adjustable to accommodate variations in the sizes of the bottles. The securing sleeve being threaded into the interior of the casing, and the cap threaded onto the exterior of the casing but free from the sleeve, permits of the cap being applied to and taken from the casing without disturbing the bottle in any way.

The securing together of the sleeve, cap, and body, at the open end of the body, either in the manner shown and described or any modifications thereof, constitutes an extremely advantageous feature of construction in devices of this character.

I claim as my invention:

1. In a device of the character described, the combination with a casing and a vacuum bottle located therein, of a sleeve engaging the neck of said bottle which projects through the top of said casing, and adjustable on the latter relative to said bottle, and an inclosing cap connected with said casing independently of said sleeve.

2. In a device of the character described, a main body part open at its upper end and provided thereat with exterior and interior threads, a rotatable sleeve projecting through the top of said body, connected thereto by the interior threads and engaging and adjustable relatively to a bottle supported in said main body, and a cap connected to said body by the exterior threads.

3. In a device of the character described, the combination with a sheet metal casing formed in one piece and provided at its open end with a single thread presenting interior and exterior engaging surfaces, and a vacuum bottle located within said casing, of a sleeve engaging the interior surface of said thread and projecting through the top of said casing to engage the neck of said bottle, and an inclosing cap engaging the exterior surface of said thread, said sleeve and cap being detachable independently of one another and said sleeve adjustable relative to said bottle.

4. A vacuum bottle casing, comprising a body open at its upper end, a vacuum receptacle located therein, a sleeve movable relative to but adapted to engage said receptacle to hold it in position within said body, and a cap inclosing said sleeve; said cap, sleeve and body being detachably secured together at the open end of said body.

5. A vacuum bottle casing, comprising a body open at its upper end, a vacuum receptacle located therein, a sleeve movable relative to but adapted to engage said receptacle to hold it in position within said body, a cap inclosing said sleeve; said cap, sleeve, and body being detachably secured together at the open end of said body, and means for preventing the movement of said sleeve while said cap is being removed.

6. A vacuum bottle casing comprising a body open at its upper end, a vacuum receptacle located therein, a support within said body for said receptacle, a sleeve rotatable relative to but adapted to engage and retain said receptacle in position within said body, a cap inclosing said sleeve, said cap, sleeve and body being detachably secured together at the open end of said body, and means for preventing the longitudinal movement of said sleeve with relation to said receptacle while the former is being secured in position.

7. A vacuum bottle casing comprising a body open at its upper end, a vacuum receptacle located therein, a support for said receptacle within said body, a sleeve rotatable relative to but adapted to engage and retain said receptacle in position within said body, a cap inclosing said sleeve, said cap, sleeve and body detachably secured together at the open end of said body, means for preventing the longitudinal movement of said sleeve relative to said receptacle while the former is being secured in position, and means for preventing the movement of said sleeve while said cap is being removed.

JOSEPH F. LAMB.

Witnesses:

KATHARINE DEXTER DONELSON,
ROBERT K. HITCHENS.